(12) United States Patent
Hicks

(10) Patent No.: US 12,372,027 B1
(45) Date of Patent: Jul. 29, 2025

(54) TURBINE APPARATUS

(71) Applicant: Edward Alan Hicks, Englewood, FL (US)

(72) Inventor: Edward Alan Hicks, Englewood, FL (US)

( * ) Notice: Subject to any disclaimer, the term of this patent is extended or adjusted under 35 U.S.C. 154(b) by 0 days.

(21) Appl. No.: 18/223,657

(22) Filed: Jul. 19, 2023

Related U.S. Application Data

(63) Continuation-in-part of application No. 16/519,964, filed on Jul. 23, 2019, now abandoned.

(60) Provisional application No. 62/701,882, filed on Jul. 23, 2018.

(51) Int. Cl.
| | |
|---|---|
| *F02C 3/16* | (2006.01) |
| *F02C 5/04* | (2006.01) |
| *F02C 7/264* | (2006.01) |
| *F02C 7/36* | (2006.01) |
| *F02C 7/22* | (2006.01) |

(52) U.S. Cl.
CPC ............... *F02C 3/165* (2013.01); *F02C 3/16* (2013.01); *F02C 5/04* (2013.01); *F02C 7/264* (2013.01); *F02C 7/36* (2013.01); *F02C 7/22* (2013.01)

(58) Field of Classification Search
CPC ...... F02C 5/02; F02C 5/04; F02C 3/16; F02C 3/165; F23R 3/10; F23R 3/56
See application file for complete search history.

(56) References Cited

U.S. PATENT DOCUMENTS

| | | | | |
|---|---|---|---|---|
| 1,687,511 | A * | 10/1928 | Powell | F02B 53/00 123/223 |
| 2,821,176 | A * | 1/1958 | Koser | F02B 53/00 418/248 |
| 3,153,907 | A * | 10/1964 | Griffith | F02C 6/02 416/129 |
| 3,712,274 | A * | 1/1973 | Craft | F02B 53/00 60/39.44 |
| 4,741,164 | A * | 5/1988 | Slaughter | F02D 17/04 123/198 DB |
| 4,807,440 | A * | 2/1989 | Salem | F02C 5/04 60/727 |

(Continued)

FOREIGN PATENT DOCUMENTS

| | | | | |
|---|---|---|---|---|
| DE | 631255 | C * | 6/1936 | F02C 5/02 |
| WO | WO-2009154511 | A1 * | 12/2009 | F02C 5/04 |

*Primary Examiner* — Alain Chau
(74) *Attorney, Agent, or Firm* — Crawford Maunu PLLC

(57) ABSTRACT

Aspects of the present disclosure are directed to apparatuses and methods involving a turbine blade that rotates with a shaft, which may be implemented with a round or toroidal-based engine housing. As may be implemented with some embodiments, an apparatus includes a shaft and turbine blade having a common axis of rotation, with each drive shaft operable to rotate independently of the other drive shaft. A housing extends around the shaft and turbine blade and has sidewall with inlet and exhaust ports. In some implementations, clutch bearings limit rotation of the drive shaft to a common rotational direction. The turbine blade and inner surface of the sidewall define chambers and operable to move circumferentially within the chamber about the axis of rotation, with the shaft to which it is coupled, and to drive the turbine blade using gas supplied via the inlet port(s) and exhausted vie the exhaust port(s).

19 Claims, 11 Drawing Sheets

(56) References Cited

U.S. PATENT DOCUMENTS

| | | | | |
|---|---|---|---|---|
| 4,860,704 | A * | 8/1989 | Slaughter | F02N 9/04 |
| | | | | 123/237 |
| 4,967,707 | A * | 11/1990 | Rogant | F01C 1/46 |
| | | | | 418/248 |
| 9,970,294 | B2 * | 5/2018 | Anderson | F02C 5/00 |
| 2002/0150481 | A1 | 10/2002 | Adamovski et al. | |
| 2013/0327010 | A1 * | 12/2013 | Muller | F02C 5/10 |
| | | | | 415/203 |
| 2014/0007837 | A1 * | 1/2014 | Anderson | F01C 1/22 |
| | | | | 123/205 |

* cited by examiner

TURBINE APPARATUS

FIELD

Aspects of various embodiments are directed to a turbine involving a single blade.

BACKGROUND

Motors and engines often employ turbine systems that convert fuel or air pressure to torque. This often utilizes extensive pressure and power to achieve energy that is sufficient to move a connected device or devices. Turbines are used in generators systems, pumping systems and various systems where sufficient pressure is able to be generated to deliver workable energy.

Motors and turbines are often used to generate torque or convert energy from a pressure to a torsion, or from a torsion to a pressure. The type of pressures needed are usually quite large and require either a large internal combustion pressure, or a large external influence such as a steam engine or hydroelectric system. The creation of a low-pressure type system has been limited in the past by materials and methodologies of turning the motor or turbine with efficiency.

The typical Air Conditioning system utilizes blower motors, fans to move the airflow; and compressors, and the pressure differential created by temperature variations in the environment to move the refrigerant through the system. The flow of the refrigerant through the various coils provides a means of either adding heat (BTU) to the air, or removing that heat from the air by cycling the refrigerant through evaporator coils. The use of different refrigerants over the years, has led to changes in the materials used to construct the AC system, but the components have largely remained the same. Variations of refrigerants and components such as the use of scroll motors for the compressors, additional condenser and or evaporator coils, and variable speed fans have increased the efficiency of the system.

While these approaches have been used with much success, there are still challenges to efficiency and operating environments where the conventional AC System will not perform at its peak. For instance, the AC system generally starts on the demand of the thermostat to start when a temperature range has been exceeded. This turns on the compressor and compressor fan, and the evaporator and evaporator fan then start to cool the environment to the desired temperature. During this process, the refrigerant needs to move to a state where it is optimal, and the Compressor, evaporator, and coils need to come to a state where they are reaching efficiency. About that time, the desired range is achieved, and the AC system shuts down. This provides additional stress on all of the components and thus shortens the life of the system. This also wastes a large amount of energy in achieving the state. By keeping the AC system running, the desired state of the refrigerant and the compressor, evaporator and coils all achieve an optimal state, but at some point, this becomes a waste of energy if the system is not removing humidity from the air, or other potential system capabilities.

While these approaches have been used with much success, there are challenges to efficiency. The shape and number of parts needed to ensure motion is extensive. These and other matters have presented challenges to the efficient use of turbines, for a variety of applications.

SUMMARY

Various example embodiments are directed to apparatuses and methods involving a turbine having a single asymmetrical turbine blade. In certain implementations, the blade is designed and/or otherwise configured with a related enclosure such that a small chamber is filled with gas or liquid, which is ejected out of the chamber while allowing a chamber on an opposite side of the blade in the enclosure to gather momentum and fill with the same material at alternating times.

Other example embodiments are directed to apparatuses and methods involving a turbine and/or pressure motor having chambers that allow the flow and expansion of the liquid refrigerant as it expands to a gaseous state, and or the addition of the high-pressure refrigerant in a gaseous state to the chamber to control the release of the BTU's of the refrigerant to convert those BTU's to motion energy. This process also allows for the control of the flow of the refrigerant in a way that allows for optimal performance of the refrigerant, compressor, and evaporator through their cycle. In addition, the turbine or motor can be utilized to remove some of the components such as cooling fans, capacitors, and electronics that mitigate the start stop process from the Air Conditioning system. The turbine or motor may also be used to generate torque for use in turning generators or other products such as pumps, fans, etc.

A turbine as characterized herein may be implemented in a variety of components, to suit particular applications. For instance, turbine involving a single blade may be utilized with a motor and/or engine, which includes a drive shaft within a housing and coupled to the turbine blade. Action of the turbine blade operates the drive shaft, which can be coupled to provide power.

Certain applications of an apparatus as characterized herein involve a closed loop Refrigerant System. Certain aspects of the present disclosure are directed to apparatuses and methods involving the use of the apparatus in various forms to generate and control Air Conditioning systems. Specific aspects involve using a modified turbine or pressure motor to control air conditioning systems to facilitate use in various environments for generating torque energy.

Aspects of various embodiments are directed to the addition of a turbine, toroid or other motor or turbine type that utilizes pressures to operate; in line with the refrigerant system, to generate energy and/or optimize the efficiency of the AC system.

Various aspects are directed to the use of a refrigerant type system, one that can utilize the pressures below 500 PSI to generate torque, is one possible way to provide energy needed for motion. By using refrigerant versus a fuel, the energy in the surrounding atmosphere can be absorbed into the refrigerant as heat energy, then that heat energy is converted to pressure energy as the heat is released and the refrigerant converts to a gas as it expands and cools (releases its heat energy). It has been recognized/discovered that this approach provides the ability to use the system to generate torque energy, horsepower, electricity, or other types of energy with the system as it is not being used to heat, cool, or dry an area.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
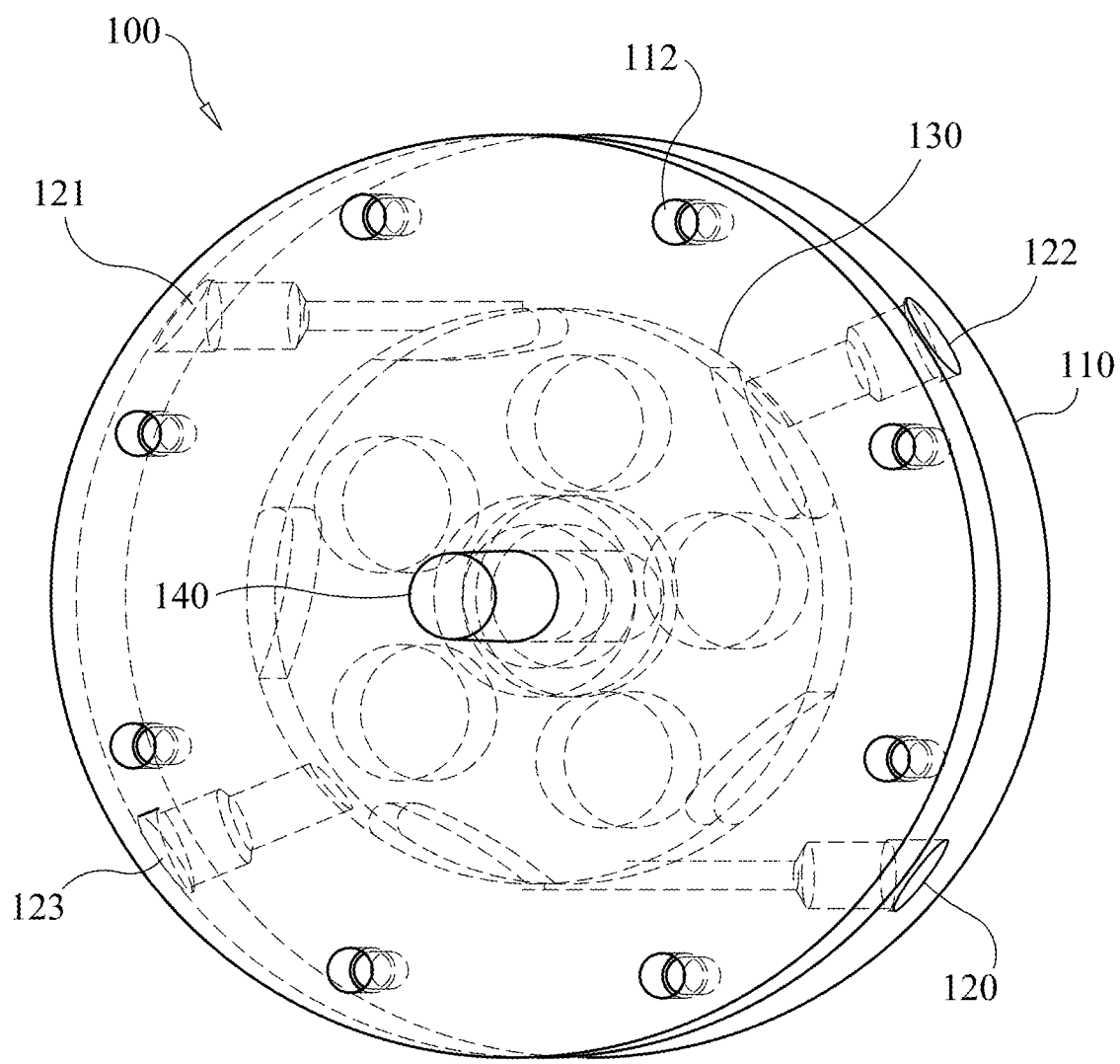
FIG. 1 shows an overall structural view of a turbine system, in accordance with an embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving conversion of refrigerants into torque or directly into energy. For various embodiments, this approach permits utilization of the properties of refrigerants. Other aspects of the present disclosure are believed to be applicable to a variety of different types of apparatuses, systems and methods involving a turbine blade, as may be implemented with a single blade within a housing.

The typical air conditioning/refrigeration system, utilizes some form of a liquid that can be converted to a gas at a certain temperature and pressure. This gas conversion process utilizes energy. However, since the goal of the air conditioning system, is to move heat or cooling from one location to the other, the AC system is tasked with moving heat energy. The process involves using the refrigerant to absorb heat, or in typical Refrigerant industry language, it is removing energy in the form of heat, or British Thermal Units or BTU's from one area, and transferring that energy to another area. This process can be quantified by the amount of energy in tons of heating the air conditioning compressor can move. It takes 1 BTU to raise 1 gallon of water 1 degree. It takes 12,000 BTUs to melt 1 ton of ice. Air Conditioning systems are measured in tons. Therefore, a 1-ton system is the equivalent of a 12,000 BTU energy moving system, i.e. it can move enough energy to melt 1 ton of ice. A 2-ton system, can move 24,000 BTU of energy or melt 2 tons of ice. A 3-ton system can move 36,000 BTU's which is enough to melt 3 tons of ice. In addition, BTU's can be converted to kilowatts and horsepower. A 1-ton AC system has the capability of producing 3.5 kW of power or 4.7 HP. It requires a certain amount of energy to run the compressor, however, the remaining energy is wasted as heat. Aspects of the disclosure capitalize on that lost energy and turn it back into energy as the BTU's are releasing their heat. When the refrigerant is cycled through the motor, it loses all of the BTU's to expansion energy as the gas expands and the heat leaves the refrigerant. This results in a reclamation of the available energy.

In various example embodiments, aspects of the present disclosure are directed to converting pressure energy to mechanical energy in a toroid-based chamber, piston chamber, or turbine type system. The process of utilizing the High-Pressure Gas combined with the High-Pressure liquid refrigerant should apply to all types of variants of motor systems. This patent is not limited to working with the motor system described in this patent request.

Certain embodiments are directed to apparatuses that rotate for use with a shaft. In connection with various embodiments, it has been recognized/discovered that such an approach can be utilized with a shape of the turbine blade that provides rapid intake and release of gasses to propel the blade and driveshaft in the direction of rotation. In certain implementations, aspects of the present disclosure have been shown to be beneficial when used in the context of expanding gas (e.g., refrigerant) or combustion, within chambers defined by the leading/trailing edge of adjacent turbine chambers and interior walls of a motor/engine housing. While not necessarily so limited, various aspects may be appreciated through a discussion of examples using such exemplary contexts.

Various example embodiments are directed to apparatuses and methods involving a turbine having a single asymmetrical turbine blade. In certain implementations, the blade is designed and/or otherwise configured with a related enclosure such that a small chamber is filled with gas or liquid, which is ejected out of the chamber while allowing a chamber on an opposite side of the blade in the enclosure to gather momentum and fill with the same material at alternating times. The enclosure may be implemented with a round engine housing, with the turbine blade and related componentry having a round exterior surface that rotates within the housing. Utilizing alternating pressures and a unique shaped chamber, the turbine can achieve high RPM and relatively high torque at lower internal chamber pressure (e.g., 200 psi.). Further, the single blade results in relatively minimal moving parts, which can mitigate wear and provide for ease of manufacture. One or more seals may be located between interfaces of the drive shafts and the housing.

According to an example embodiment, an apparatus includes a single drive shaft. A housing extends around the drive shaft and defines a sidewall of a chamber having inlet and exhaust ports which are located to take advantage of the filling up of a cup in the chamber, while alternatingly exhausting pressure when the blade reaches the "closed" cycle. The drive shaft may be coupled to a bearing that maintains separation of the blade from the body and provides low-friction or frictionless rotation.

In particular embodiments, propulsion for the turbine blade is garnered using energy released as pressure energy in an air conditioning (AC) system, from the change of state of high-pressure liquid within the system to a high-pressure gas. That energy is utilized to turn the turbine and thus turn an electrical generator that replenishes electrical energy needed to power the AC System. In various embodiments, low pressure gasses or liquids can be utilized to turn the electrical generator or generators. Certain implementations involve stacking multiple turbines in separate bodies to extend the utilization of various gasses and liquids. Certain embodiments involve a fuel air mixture, with spark and exhaust internally to achieve a combustion engine.

In various example embodiments, aspects of the present disclosure are directed to converting pressure energy to mechanical energy in a circular chamber. Certain aspects involve a motor that uses an exterior pressure source, and other aspects involve an engine that generates pressure by use of an internal combustion type of system. Rotating combustion/pressure sub-chambers travel around the chamber and generate mechanical energy that is applied to a central drive shaft. The mechanical energy provided via the drive shaft can be utilized in a variety of manners, such as to directly drive mechanical components such as a wheel or machine, or to drive an electrical generator for generating electricity. In addition, a magnetic material can be used in the construction of the turbine blade, and an electrical windings type circuit may be employed around the chamber and utilized to collect inductive energy generated by magnetic fields of the magnetic material in the blade. In some embodiments, clutch bearings or other mechanisms can be employed to limit rotation of the drive shaft to a single direction, which can further be utilized to generate the additional torque needed for some applications.

A variety of intake and exit port arrangements can be used to utilize pressurized gas for driving the blade chambers and compression chambers and, therein, a drive shaft. Airflow may be set by putting an exhaust port at a maximum range of travel of each turbine chamber from an intake manifold for an external pressure embodiment, or a degree location on an internal combustion embodiment. As the sub-chamber defined by leading and trailing surfaces of adjacent turbine chambers fills with gas, the adjacent turbine chambers force the gas through the exhaust port or create sufficient pressure with heat or spark to create combustion. Rotation is limited to the same direction, and the gas moves the turbine chambers toward the exhaust manifold port. Upon rapid expansion, gas pressure upon the leading surface of one of the turbine blade chambers forces the alternate intake port to be temporarily occluded and the exhaust port of the that section of the blade to When the gas has reached its maximum expansion, the port is closed on the exhaust manifold side (by virtue of movement of the turbine blade). This approach can eliminate the need for valves on the exhaust port (or similarly on intake ports).

External pressure may be provided by a pressurized gas, such as by utilizing a heat exchanger (e.g., with refrigerant that expands upon conversion between states or otherwise). In this context, an air conditioning type system can be used to generate torque as the air is leaving the low side of the system and entering the high side of the system. This in turn can be used to drive a generator that can be used to recycle some or most of BTU's that would otherwise be lost, back into energy.

Pressure may be generated via combustion, which may be provided using one or more of a variety of gases and combustion techniques. For instance, a spark and fuel air mixture or a glow plug and fuel air mixture may provide an expanding field of pressure that expands into an expansion section of the turbine blade, which propels the blade toward the exhaust port. The use of a clutch bearing will ensure that the direction of force is toward the rotation of the blade and not static or reversing the direction of the blade. Such a spark or glow plug can be implemented in the sidewalls of the chamber in which the turbine blade moves. A carburetor or fuel injection system can be used to provide increases and decreases in speed.

In some implementations (e.g., with externally-provided gas pressure), the turbine blade, drive shaft, chamber and in some instances, a clutch bearing, draw gas in through an inlet port and contain the gas within a portion of the chamber bound by sidewalls of the chamber and respective leading and trailing surfaces of adjacent ones of the turbine blade. Expansion of the gas is utilized to drive the turbine blade having a trailing surface that bounds the portion of the chamber. Upon rotation of the driven turbine blade chamber past the exhaust port, the expanded gas is exhausted from the chamber.

For various combustion embodiments, an apparatus as above includes an ignition source. The ignition source, turbine blade and clutch bearing operate to drive the drive shaft utilizing the ignition source to ignite fuel and therein generate pressure force upon a surface of one of the turbine blade chambers, which is translated to the drive shaft connected thereto.

In a particular embodiment, the turbine blade, drive shaft and housing may operate with the ignition source to carry out a fuel combustion cycle for such sub-chambers as follows. In a fuel intake stage, fuel is received into a sub-chamber via the inlet port, with a large turbine chamber receiving a fuel air mixture, the leading and trailing surfaces of the adjacent compression stages of the blade being engaged with the housing sidewall on opposite sides of the inlet port. In a fuel combustion stage, a narrow combustion chamber is provided between the sidewall and the leading and trailing surfaces of the small chamber, and the fuel is ignited therein. The ignited fuel is used to drive the shaft connected to the turbine blade having the trailing surface of the combustion chamber by applying pressure from the ignited fuel upon the outer body of the blade and thus expanding into the large blade chamber. In an exhaust stage, gas generated by the ignited fuel via is exhausted via the outlet port, with the leading and trailing surfaces of the adjacent ones of the turbine blade engaged with the sidewall on opposite sides of the outlet port.

A consistent with various embodiments, each turbine blade may include one or more magnets or other magnetic material. In some embodiments, an electric coil is implemented to generate electricity by utilizing movement of the magnetic field generated by each magnet.

Turning now to the figures, FIG. 1 shows an overall structural view of a turbine apparatus 100, in accordance with another embodiment. An outer housing 110 may be affixed with fasteners by way of openings as shown (including 112), and is depicted with intake and exhaust ports including intake port 120 and exhaust port 122. A turbine blade 130 is located within the housing 110, having respective chambers along an outer circumference thereof that are configured to receive gas via the intake port 120 and to expel gas via the exhaust port 122, as well as via (hidden) intake port 121 and exhaust port 123. The turbine blade 130 is coupled to a shaft 140 that rotates with the turbine blade and can be used to output mechanical energy.

Figure 2:
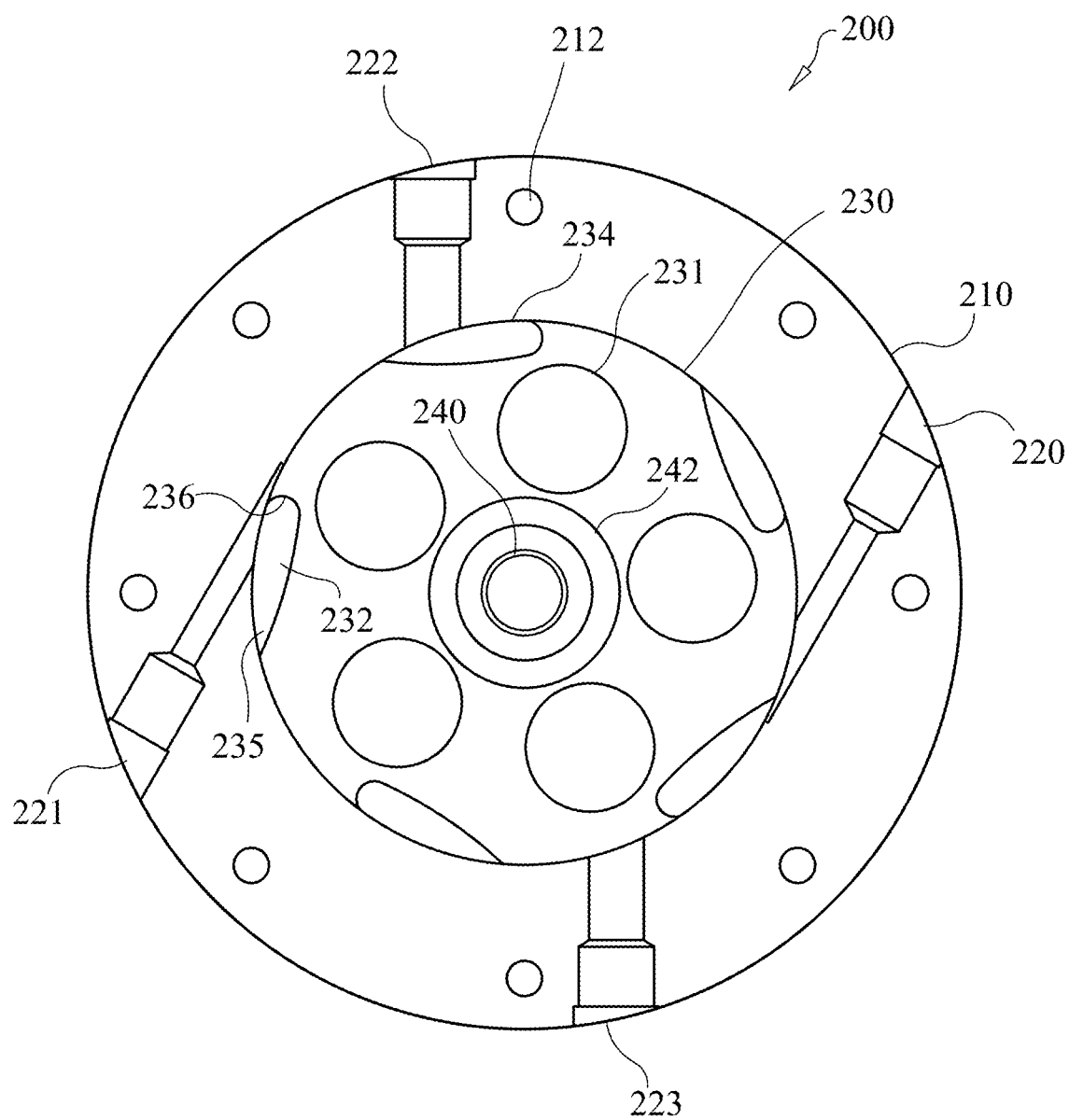
FIG. 2 shows a top down wireframe cross-sectional view of a turbine apparatus, in accordance with an embodiment.

FIG. 2 shows a top down wireframe cross-sectional view of a turbine apparatus 200, in accordance with an embodiment. The apparatus 200 may, for example, be utilized with the apparatus 100 shown in FIG. 1, in view of which various numbering in FIG. 2 follows that used in FIG. 1. The apparatus 200 includes a housing 210, which may be fastened via openings including opening 212, in which a single turbine blade 230 resides. By way of example, the turbine blade 230 is shown with five chamber regions. Intake ports 220 and 221 provide inlet gas, an exhaust ports 222 and 223 exhaust gas from the chambers. For example, chamber 232 is shown in position to receive intake gas from inlet port 221, and chamber 234 is shown in position to exhaust gas, having been received from inlet port 221, through exhaust port 222. The turbine blade 230 is shown with five chambers, but may be implemented with fewer or more chambers, to suit particular applications. The layout of the intake and exhaust ports may be offset as shown to provide torque to respective intake chambers at different times during the cycle of the turbine. The turbine blade 230 is mounted to a shaft 240 for (clockwise) rotation, and may have openings including opening 231 therein to reduce weight. A clutch or other component 242 may be utilized to ensure that the shaft 240 only rotates in one direction.

Gas compression and expansion can be implemented in a variety of manners, involving for example, a refrigerant that expands as part of a phase change, or a combustion event. Referring to chamber 232, in response to gas pressure provided through the inlet port 221, the turbine blade 230 rotates clockwise utilizing the gas pressure on a leading edge 236 of the chamber, and with a trailing edge 235 facilitating compression.

Figure 3:
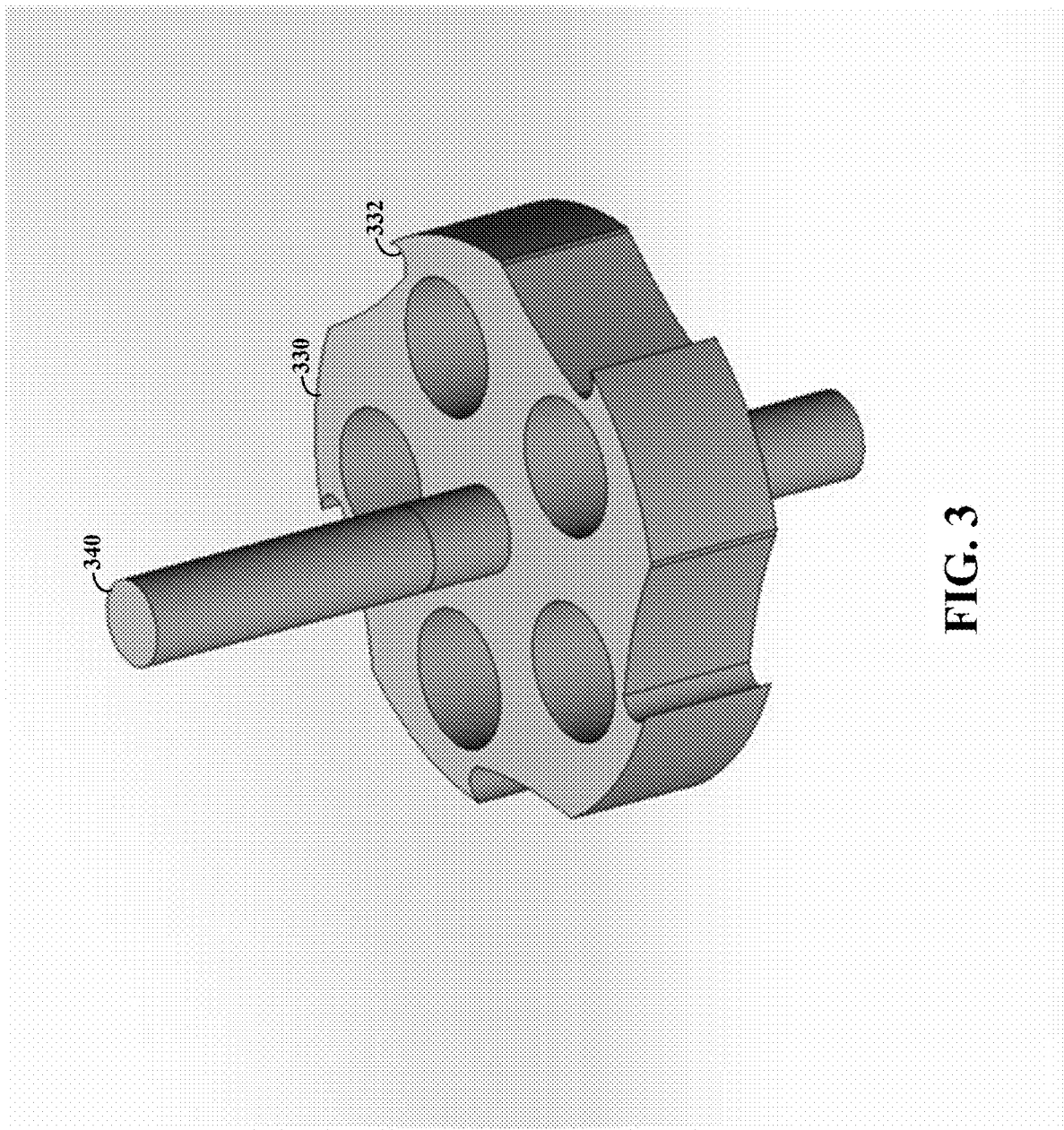
FIG. 3 shows the oblique view of a turbine blade coupled to a shaft, in accordance with an embodiment.

FIG. 3 shows an oblique view of a turbine blade 330 coupled to a shaft 340, in accordance with another embodiment. The turbine blade 330 and shaft 340 may, for example, be implemented as the turbine blade 230 and shaft 240 of FIG. 2. The turbine blade 330 is shown with five chamber regions including chamber region 332, which when coupled with a housing form chambers in which gas expansion/combustion may occur to drive rotation of the turbine blade 330 and therein rotate the shaft 340.

Figure 4:
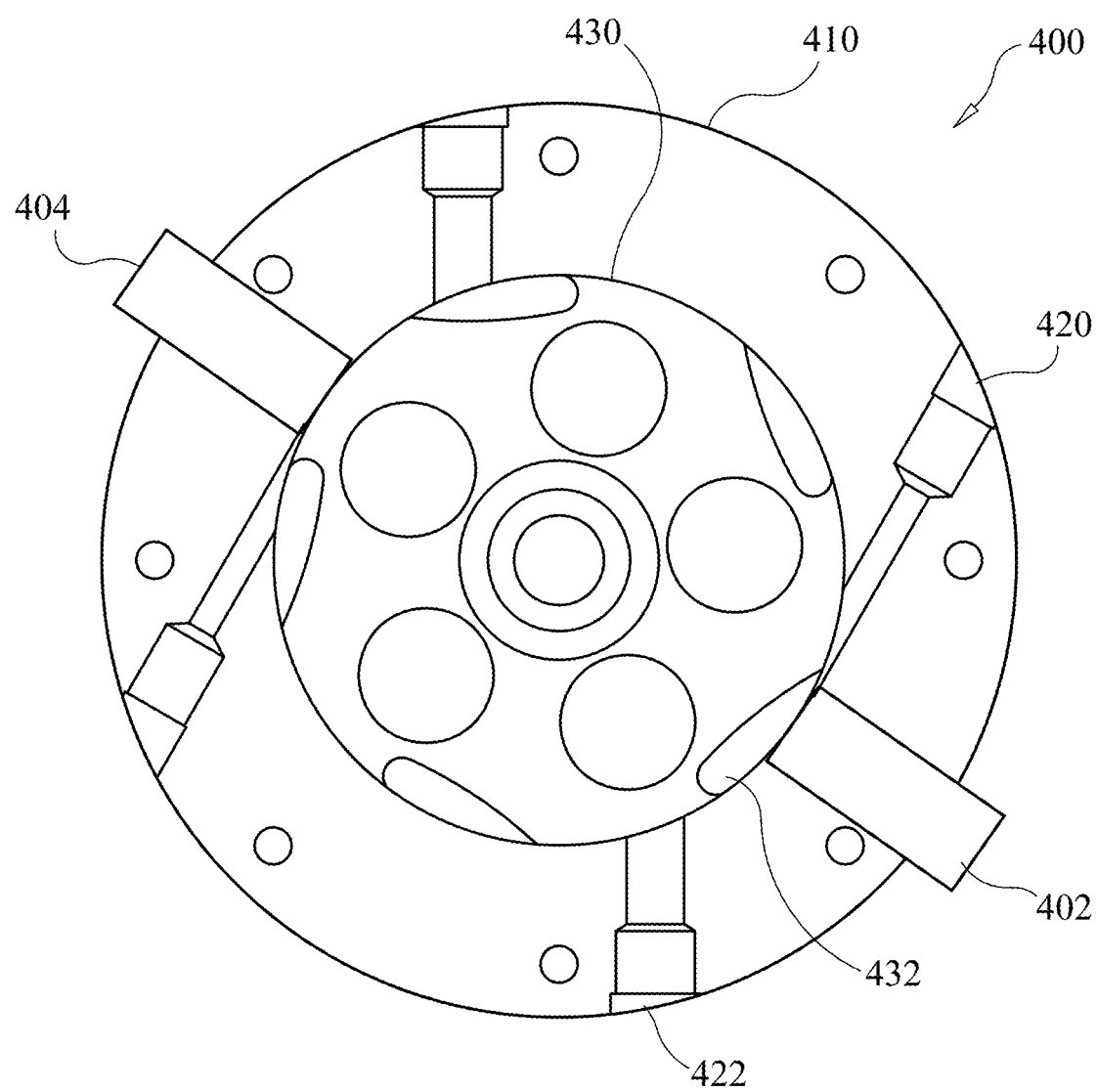
FIG. 4 shows a turbine apparatus with ignition sources for a compression stage, in accordance with an embodiment.

FIG. 4 shows a turbine apparatus 400 with ignition sources 402 and 404 for a compression stage, in accordance with another embodiment. Such an approach may, for example, be implemented with a turbine apparatus such as shown in FIG. 2, with the turbine blade 430 within housing 410 implemented as blade 230 in the housing 210 with added ignition sources. The ignition sources may, for example, include one or more of a spark plug, a glow plug or some other heat source that can ignite a fuel air mixture and provide forward momentum of the turbine blade 430 toward exhaust ports.

Operation of the apparatus 400 may be as follows. A fuel/air mixture is supplied via inlet port 420 into chamber 432. The turbine blade 430 rotates clockwise toward ignition source 402, which ignites the gas in chamber 432. This drives the turbine blade 430 forward in a clockwise rotation, and gas is exhausted from chamber 432 when the chamber passes under exhaust port 422.

Figure 5:
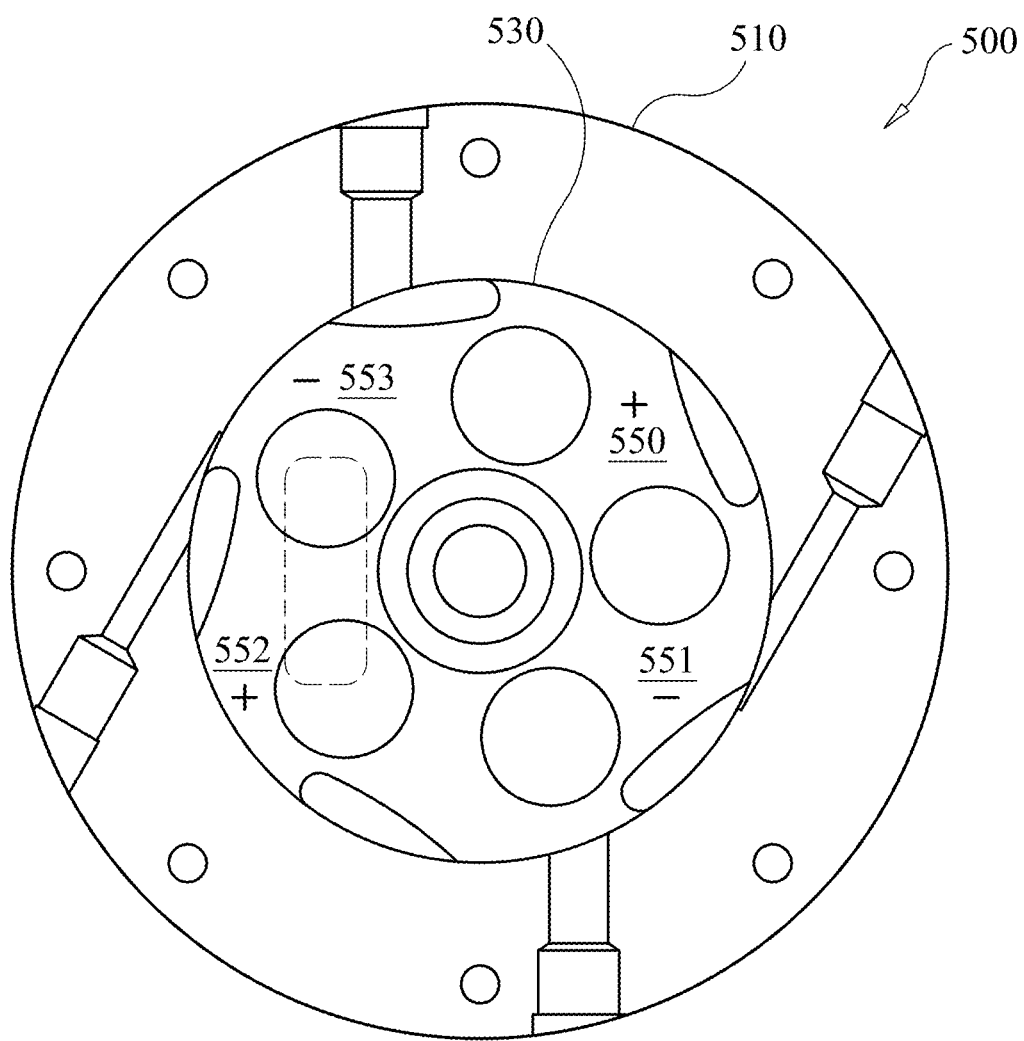
FIG. 5 shows a turbine apparatus configured for providing a magnetic field, in accordance with an embodiment.

FIG. 5 shows a turbine apparatus 500 configured for providing a magnetic field, in accordance with another embodiment. The apparatus 500 may, for example, be implemented in accordance with the turbine blade 230 and housing 210 of FIG. 2, with related exhaust ports and turbine chambers. As such, discussion of such components is omitted here for brevity. The turbine blade 530 includes magnetic material such as magnets to provide positive poles at 550 and 552, and negative poles at 551 and 553. Accordingly, as the turbine blade 530 is driven with gas, a corresponding magnetic field is generated and used to provide energy. For instance, electrical energy can be generated by induction of a magnetic field in an electric coil, such as may be implemented as electric coil 560.

Figure 6:
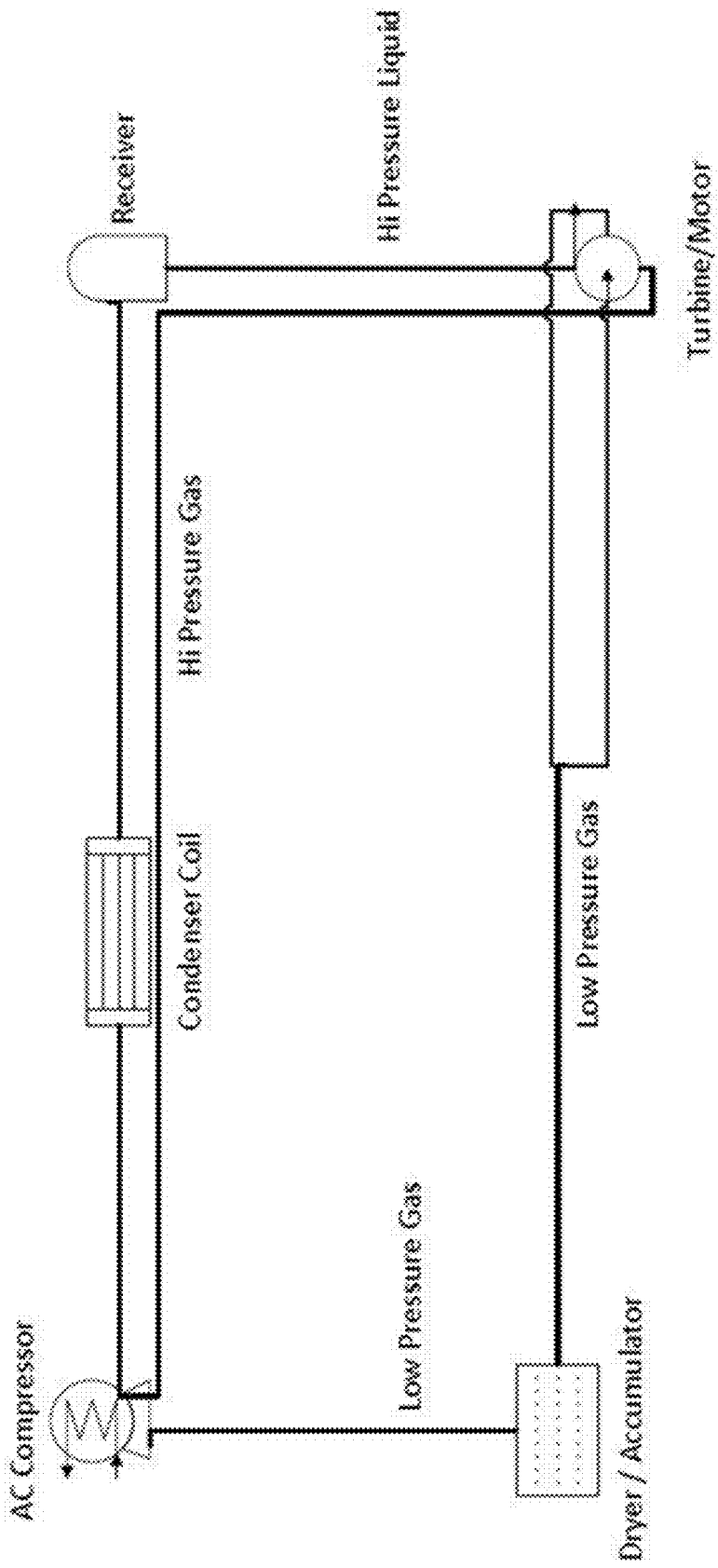
FIG. 6 shows a configuration whereas the system is designed to be a standalone power generating system.

FIG. 6 shows a configuration whereas the system is designed to be a standalone power generating system. This system utilizes the high-pressure heat as the "air mixer" and the high-pressure liquid as the "fuel mixer" similar to a standard gasoline or diesel engine. The fuel mixture is either directly fed into the chambers of the motor, or is mixed outside of the motor as in the case of a carbureted vehicle.

Figure 7:
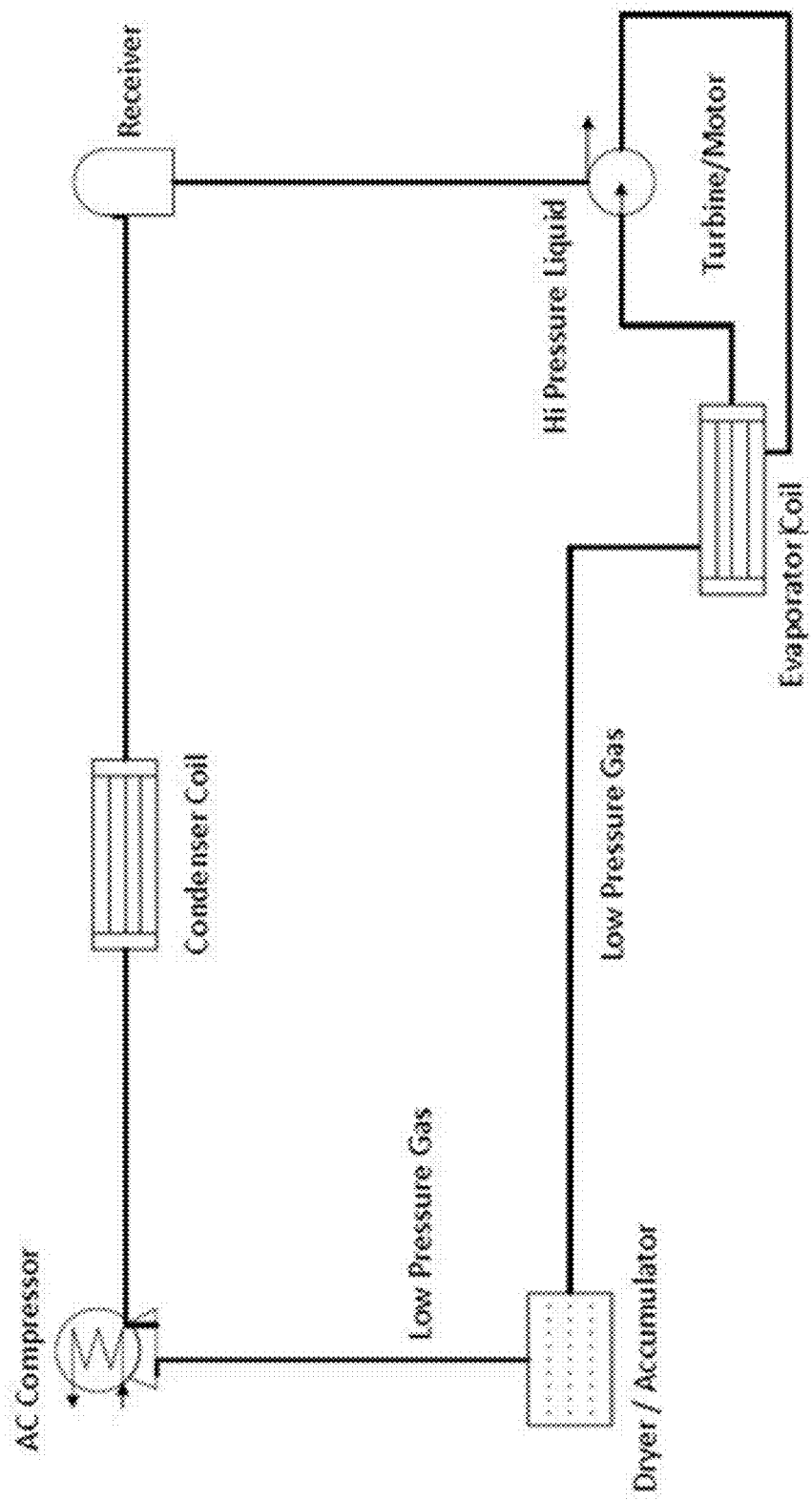
FIG. 7 shows a configuration where extra evaporation of the refrigerant is handled in a late stage evaporator coil.

FIG. 7 shows a configuration where extra evaporation of the refrigerant is handled in a late stage evaporator coil. This reduces the amount of liquid going back to the compressor, and thus removing the potential to damage the compressor.

Figure 8:
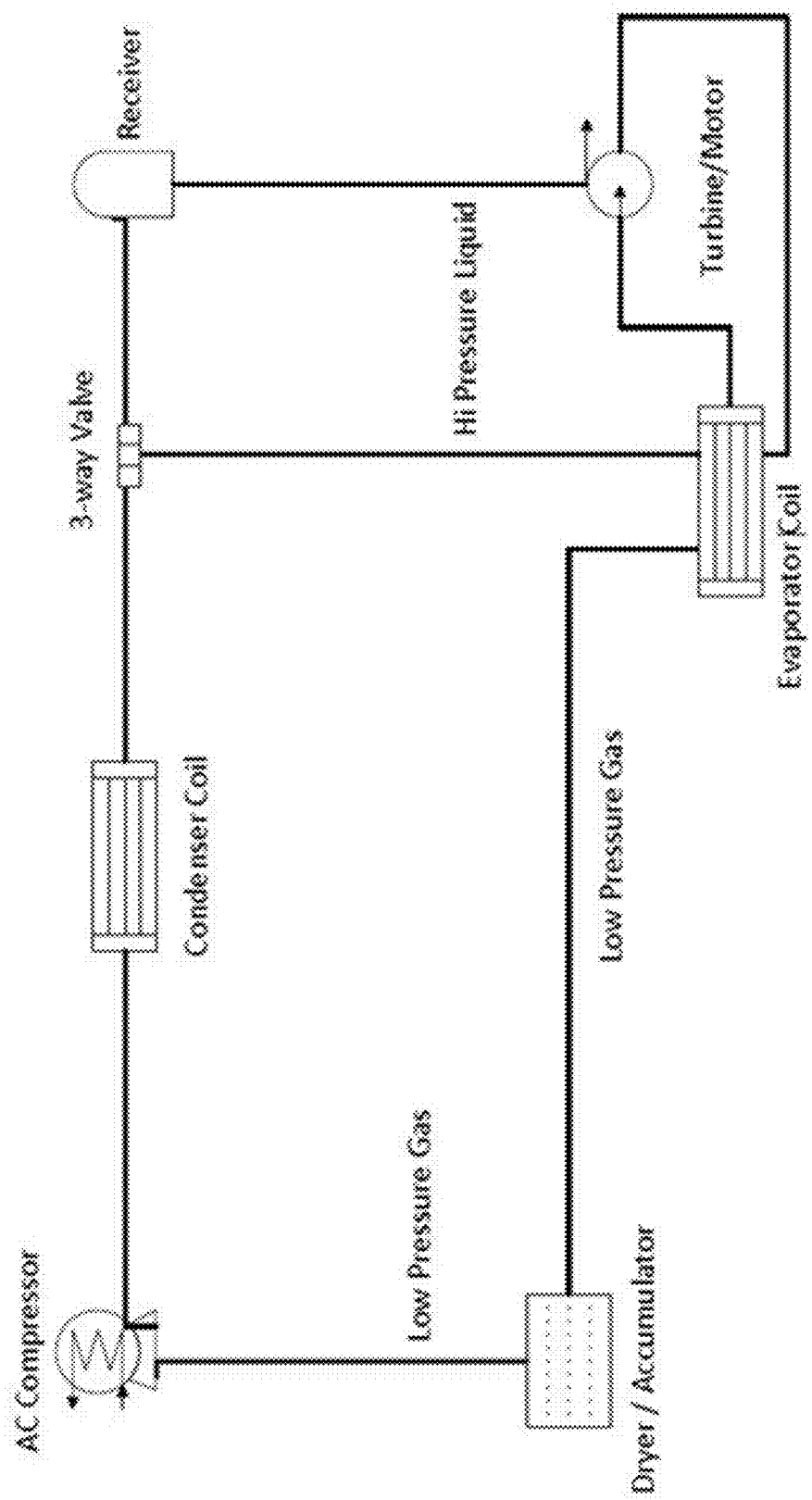
FIG. 8 shows a configuration whereas the system is designed to run as a power generating system until the system is needed to cool or heat the area.

FIG. 8 shows a configuration whereas the system is designed to run as a power generating system until the system is needed to cool or heat the area. At that time, the 3-way valve is actuated in order to divert the high-pressure fluid to the evaporator. The system would run until the area was cooled or heated to the appropriate level and then the system would divert the fluid back to the motor. This would provide a much more efficient AC system, as the refrigerant fluid would not need to go through the process of optimizing which typically occurs in the first few minutes of an AC system coming online.

Figure 9:
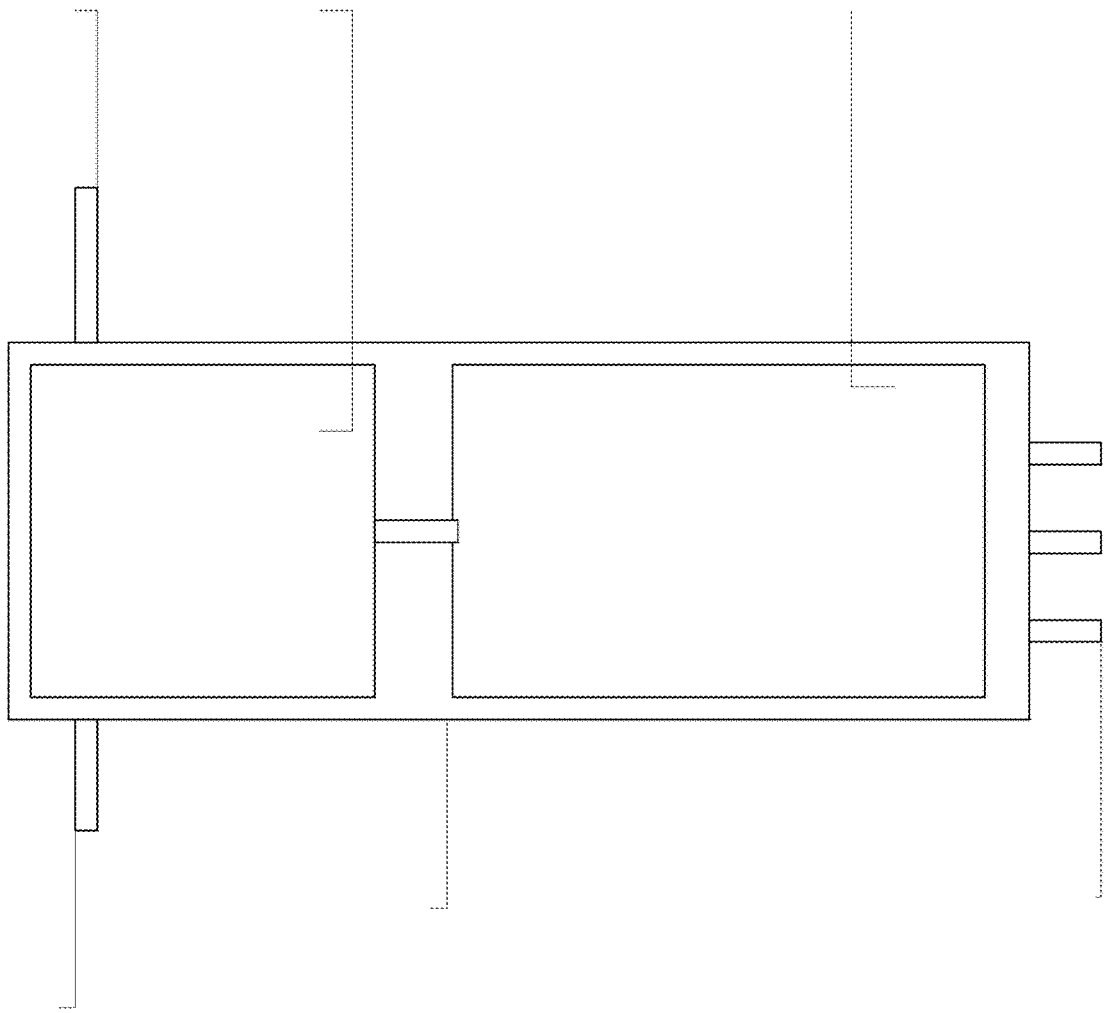
FIG. 9 shows an enclosure containing the motor/turbine system and the generator or alternator in a single enclosed housing that is hermetically sealed and provides the capability of generating electricity, either Alternating Current or Direct Current, or both, in an enclosure that can be located anywhere that power is needed.

FIG. 9 shows an enclosure containing the motor/turbine system and the generator or alternator in a single enclosed housing that is hermetically sealed and provides the capability of generating electricity, either Alternating Current or Direct Current, or both, in an enclosure that can be located anywhere that power is needed.

Figure 10:
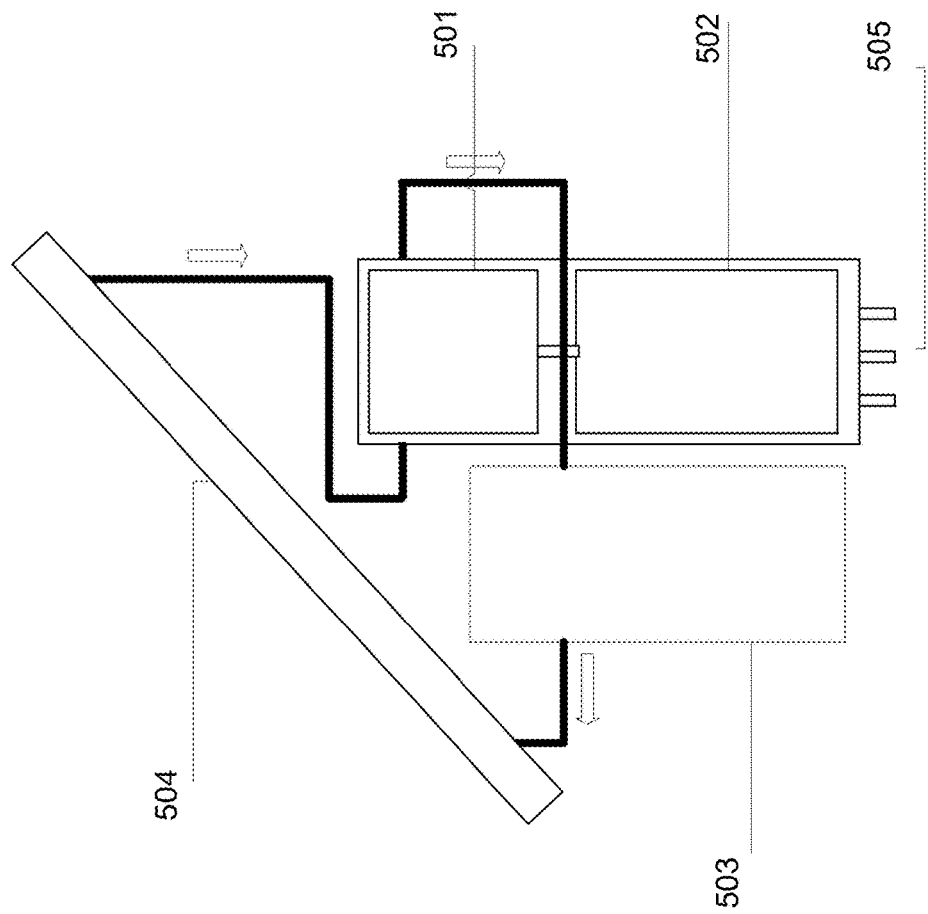
FIG. 10 shows a self-contained system that can be utilized as a portable energy generating system.

FIG. 10 shows a self-contained system that can be utilized as a portable energy generating system. This system can be initially started using batteries and can be run on various types of gasses and refrigerants. This system can also utilize a smaller amount of energy to drive the compressor motor and then utilize the additional BTU's gathered from the environment to turn the motor/turbine and generate more electricity than utilized based on the principals stated. This system can be designed to work in any environment based on the type of gas used.

Figure 11:
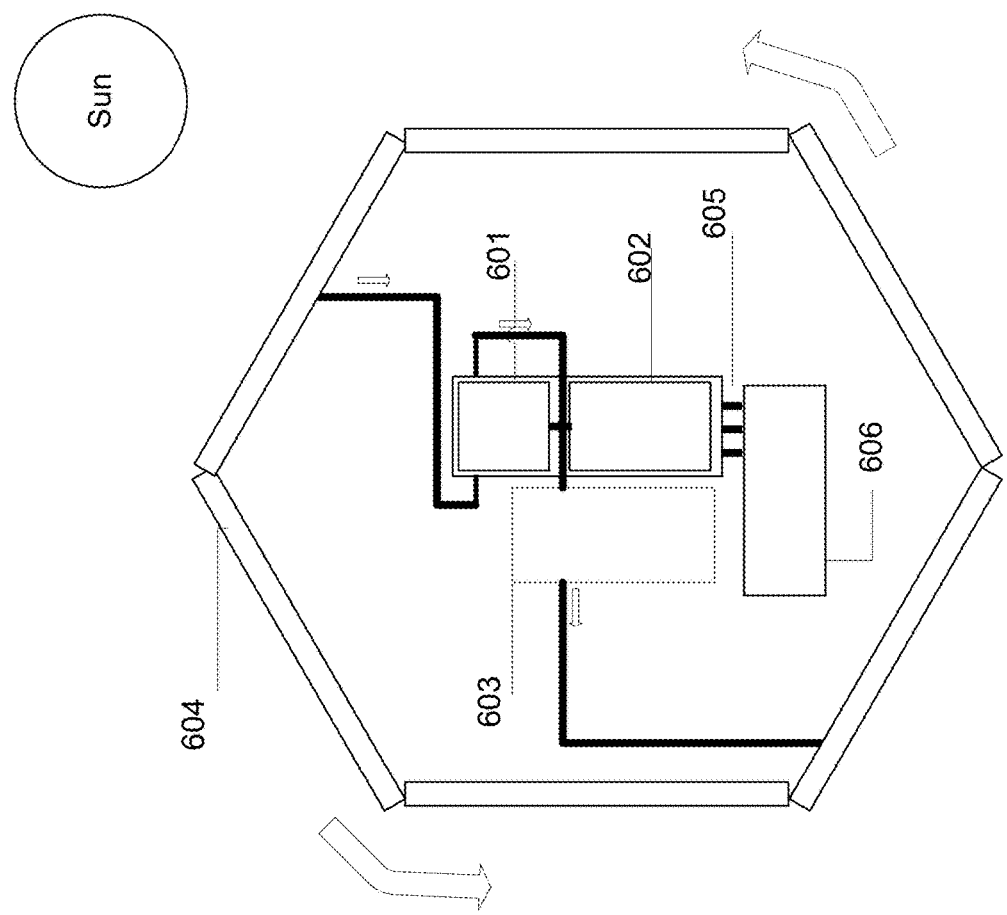
FIG. 11 shows another embodiment involving an energy system that may be implemented in multiple situations.

FIG. 11 shows another embodiment involving an energy system that may be implemented in multiple situations. For instance, a version could be created to work on the moon, or as the internal power source for equipment for a satellite system in space. The type of gas or refrigerant used would be something with a lower freezing point such as nitrogen. The system could be structured to use the natural rotation of the moon, or an artificially created rotation of the satellite to cause the movement of the gas from a liquid to gaseous state, and thus drive the pressure and temperature differential needed to release the BTU's into the motor/turbine. 601 shows the motor or turbine that converts the heat generated when the sun hits the solar panels (604) which in turn turns a DC motor system (605) which can then utilize the DC power to be stored and converted to AC if needed by the battery/inverter system (606). Additionally the system can add a small evaporator system (603) to keep the internal instruments or equipment cool or at a constant thermal temperature.

Various additional embodiments are directed toward an apparatus in which a turbine and or motor with chambers that allow the expansion and control of refrigerant elements of an Air Conditioning system in order to optimize the elements of the AC system. The redirection of the high pressure liquified refrigerant to the turbine/motor system is used to allow for the modification of the flow pattern of the refrigerant and optimization of the refrigerant cycle. Another embodiment is directed to adding high-pressure gas of an AC system to the same turbine motor in either the same chamber, or additional chambers to provide for additional modification of the refrigerant in the system. In some implementations, the compressor fan may be omitted. Various such approaches may facilitate a small footprint on the compressor side of a system, which allows for the use of the temperature generated by the compressor and the addition of the high side pressures, to create a closed condenser environment. The turbine or motor may use the torsion capabilities to provide additional work such as turning a fan, generator or pump, or other mechanical device. Heat or BTU's may be absorbed from the environment and converted to torque energy to power the motor or turbine and in turn, generate additional electricity that only utilizes the external energy and does not affect the compressor energy consumption.

Expansion of gas may be used to drive the motor/turbine in a manner that changes environmental conditions and removes heat from areas where excess heat is an issue. This could be a location where concerns for excess heat is an issue and the addition of cold power would help regulate the environment.

In certain embodiments, heat is added to an environment where excess cold is the issue and the system could be used to generate heat to help regulate the environment.

In some embodiments, the expansion of the refrigerant liquid to a gas is utilized with one or more apparatuses depicted herein, and energy from the heat release is harnessed as that conversion takes place.

Another embodiment is directed to a system that can leverage solar systems to heat up Refrigerant, or reclaim wasted heat by having the evaporator side of the system reclaim heat from heat generating systems such as Solar Farms, Evaporative cooling systems, existing AC systems. Etc.

Based upon the above discussion and illustrations, those skilled in the art will readily recognize that various modifications and changes may be made to the various embodiments without strictly following the exemplary embodiments and applications illustrated and described herein. For example, additional turbine blades may be added, or may be removed. Embodiments shown as engines can be implemented with a motor, and vice-versa. A drive shaft or shafts can be coupled to the depicted turbine blades and to further componentry, with embodiments being directed to larger systems employing those aspects as shown (e.g., including an air conditioning system that provides gas that drives the turbine blades, as well as a generator coupled to one or more of the drive shafts). Further, the shape of the chambers and rotational direction of the turbine blades characterized herein may be implemented with different shapes and/or with different rotational direction. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
    a housing having a sidewall and inlet and exhaust ports in an inner surface of the sidewall, the inner surface being fixed in position relative to the housing;
    a shaft extending within the housing and having an axis of rotation;
    a turbine blade in the housing, coupled to the shaft and configured to rotate within the housing and about the axis of rotation, the turbine blade having an outer surface along a perimeter that faces the inner surface of the sidewall, the outer surface of the turbine blade having recesses with a majority of a surface area thereof facing the inner surface of the sidewall, the surface area of the recesses and the inner surface of the sidewall defining enclosed chambers separated from one another along the outer surface of the turbine blade to remain sealed from one another as the chambers rotate about the shaft, each chamber having sidewalls that:
        consist of the outer surface of the turbine blade and the inner surface of the sidewall when the chambers are sealed to portions of the sidewall between the inlet and exhaust ports, and
        rotate about the shaft within the housing to receive high pressure fluid via the inlet port with the chamber aligned to the inlet port, and exhaust low pressure gas via the exhaust port with the chamber aligned to the exhaust port; and
    an ignition source configured and arranged with the turbine blade, shaft and housing to carry out a fuel combustion cycle by, for one of the chambers:
        in a fuel intake stage, receive fuel into the chamber via the inlet port;
        in a fuel combustion stage, provide a combustion chamber between the sidewall and the surface area of the recess with the chamber rotated past the inlet port, ignite the fuel in the combustion chamber via the ignition source, and utilize the ignited fuel to apply pressure that rotates the turbine blade and therein drives the shaft; and
        in an exhaust stage, exhaust gas generated by the ignited fuel via the exhaust port.

2. The apparatus of claim 1, further including a clutch bearing connected to the shaft and configured and arranged to limit rotation of the shaft relative to the turbine blade to a single rotational direction, wherein the turbine blade is configured to cause the shaft to rotate in response to receiving the high pressure fluid via the inlet port, and wherein the high pressure fluid includes a material selected from the group of: liquid, gas, liquid expanding to a gaseous state, and a combination thereof.

3. The apparatus of claim 2, wherein the shaft and turbine blade are configured and arranged to, in response to fluid pressure within one of the chambers provided through the inlet port, rotate the shaft in a rotational direction utilizing the fluid pressure on a leading edge of chamber while utilizing the clutch bearing to prevent rotation of the shaft in an opposite rotational direction.

4. The apparatus of claim 1, wherein a leading surface of each chamber forms an enclosed portion of the chamber bound by the leading edge of the chamber, the inner surface of the sidewall and a trailing edge of the chamber, wherein the shaft and turbine blade are configured and arranged to, in response to fluid pressure within in the enclosed portion of the chamber via fluid provided through the inlet port, rotate the shaft utilizing the fluid pressure on the leading edge of the chamber while utilizing a clutch bearing to prevent rotation of the shaft in the opposite rotational direction.

5. The apparatus of claim 1, wherein the turbine blade, shaft, and housing are configured and arranged to:
    draw gas in the chambers through the inlet port,
    contain the gas within the chambers as defined by the recesses and the inner surface of the sidewall as the chambers rotate beyond the inlet port via which the gas is drawn in while utilizing expansion of the gas to drive the turbine blade, and upon rotation of the chambers to the exhaust port, exhaust the expanded gas from the chamber.

6. The apparatus of claim 1, wherein the turbine blade includes magnetic material configured and arranged with polarities that provide a magnetic field that moves as the turbine blade rotates, further including an electric coil configured and arranged to generate electricity by utilizing movement of the magnetic field.

7. The apparatus of claim 1, wherein the majority of the portion of the outer surface of the turbine blade located in the recesses faces the inner surface of the sidewall is fixed relative to the rest of the turbine blade and wherein each chamber is bound entirely by the outer surface of the turbine blade and the inner surface of the sidewall at all positions of rotation in which the chambers are not aligned to the inlet or exhaust ports.

8. The apparatus of claim 1, wherein each chamber receives gas directly via the inlet port, with the gas passing through an opening of the inner surface of the sidewall and directly into the chamber.

9. A power generation system comprising:
a compressor to compress material from a low pressure gaseous state to a high pressure gaseous state;
a condenser coil to condense the material in the high pressure gaseous state to a high pressure liquid state, therein providing high pressure liquid;
a turbine having;
   a housing having a sidewall and inlet and exhaust ports in an inner surface of the sidewall, the inner surface being fixed in position relative to the housing;
   a turbine blade within the housing and having an outer surface along a perimeter that faces the inner surface of the sidewall, the outer surface of the turbine blade having recesses with a majority of a surface area thereof facing the inner surface of the sidewall; and
   a shaft within the housing, coupled to the turbine blade and having an axis of rotation about which the turbine blade and shaft are configured to rotate, the turbine being coupled to the compressor and condenser coil for receiving the high pressure liquid, the turbine being configured and arranged with the compressor and condenser coil to generate power using the high pressure liquid to drive the turbine blade and turn the shaft, and to output the material as a low pressure gas, the surface area of the recesses and the inner surface of the sidewall defining enclosed chambers having sidewalls that:
   consist of the outer surface of the turbine blade and the inner surface of the sidewall, and
   rotate about the shaft within the chamber to receive the high pressure liquid via the inlet port and exhaust low pressure gas via the exhaust port; and
a gas conduit to deliver the low pressure gas to the compressor, wherein the turbine blade, shaft, and housing are configured and arranged to:
   in an intake stage, draw fluid in the chamber through the inlet port with leading and trailing surfaces of the chamber engaged with the sidewall on opposite sides of the inlet port;
   contain the fluid within the chamber as defined by the recesses and the inner surface of the sidewall as the chambers rotate beyond the inlet port via which the gas is drawn;
   in an expansion stage, provide an expansion chamber between the sidewall and the leading and trailing surfaces as the chamber rotates past the inlet port, expand the fluid in the expansion chamber, and utilize the expanded fluid to apply pressure that rotates the turbine blade and therein drives the shaft; and
   upon rotation of the chambers to the exhaust port, exhaust the expanded fluid from the chamber as the chamber passes the exhaust port with the leading and trailing surfaces of the chamber engaged with the inner surface of the sidewall on opposite sides of the exhaust port.

10. The system of claim 9, further including an evaporator coil coupled in the gas conduit to receive an output of the turbine including low pressure gas and low pressure liquid, and to expand the low pressure liquid to reduce an amount of liquid provided to the compressor.

11. The system of claim 10, further including a dryer/accumulator coupled in-line with the gas conduit between the turbine and the compressor, the dryer/accumulator being configured to remove liquid from the low pressure gas material provided to the compressor.

12. The system of claim 11, further including a receiver to receive and store the high pressure liquid from the condenser, and to provide the high pressure liquid to the turbine.

13. The system of claim 10, further including a valve coupled to receive the high pressure liquid from the condenser coil and to selectively route the high pressure liquid to the turbine for generating power, or to the evaporator coil to provide cooling.

14. The system of claim 13, wherein the valve is configured to, in response to sufficient cooling being achieved, selectively route the high pressure liquid to the turbine.

15. The system of claim 9, wherein the compressor is configured to provide a portion of the material in the high pressure gaseous state to the turbine, and wherein the turbine is configured to mix the high pressure gas with the high pressure liquid.

16. The system of claim 15, wherein:
the material is combustible; and
the turbine includes an ignition source configured to ignite the material to provide energy that drives the turbine for creating the power.

17. The system of claim 15, wherein the portion of the material in the high pressure gaseous state is mixed with the high pressure liquid within the turbine housing.

18. The system of claim 15, wherein the portion of the material in the high pressure gaseous state is mixed with the high pressure liquid prior to injection into the turbine housing.

19. The system of claim 9, further including an ignition source, wherein the turbine blade, shaft, and housing are configured and arranged with the ignition source to carry out a fuel combustion cycle by, for one of the chambers:
   in the intake stage, receive fuel into the chamber via the inlet port with leading and trailing surfaces of the chamber engaged with the sidewall on opposite sides of the inlet port;
   in the expansion stage, provide a combustion chamber between the sidewall and the leading and trailing surfaces as the chamber rotates past the inlet port, ignite the fuel in the combustion chamber via the ignition source, and utilize the ignited fuel to apply the pressure that rotates the turbine blade and therein drives the shaft; and in an exhaust stage, exhaust gas generated by the ignited fuel via the exhaust port as the chamber passes the exhaust port with the leading and trailing surfaces of the chamber engaged with the inner surface of the sidewall on opposite sides of the exhaust port.

* * * * *